United States Patent Office 3,437,672
Patented Apr. 8, 1969

3,437,672
CONDENSATION OF ALKYLFURANS WITH POLYHALOOLEFINS
Louis Schmerling, Riverside, Ill., assignor to Universal Oil Products Company, Des Plaines, Ill., a corporation of Delaware
No Drawing. Filed June 10, 1965, Ser. No. 463,027
Int. Cl. C07d 5/14; A01n 9/28
U.S. Cl. 260—346.1                   8 Claims

ABSTRACT OF THE DISCLOSURE

Preparation of a 3-chloroallylic furan by heating a mixture of an alkylfuran, a polyhaloolefin and a free radical generating compound at a temperature of 50°–300° C. and at least as high as the decomposition temperature of the free radical generating compound, the alkylfuran being characterized in that it contains at least one hydrogen atom attached to an alpha-carbon atom of an alkyl substituent and the polyhaloolefin being characterized in that it contains at least one chlorine atom attached to each of two double-bonded carbon atoms.

---

This invention relates to a novel process for preparing 3-chloroallylic furans. More particularly, this invention relates to the condensation of certain alkylfurans with certain polyhaloolefins to yield the desired 3-chloro allylic furans.

It is an object of this invention to prepare 3-chloroallylic furans. The products prepared in accordance with the process of this invention will find a variety of uses in the chemical field, for example, as intermediates in the preparation of polymers, resins, pharmaceuticals and in the synthesis of diverse organic chemicals. Some of the products are useful per se as insecticides or they may be reacted with other polyhaloolefins in a Diels-Alder type reaction to form halo substituted materials with insecticidal properties. For example, 2-(3-chloroallyl)-furan, the condensation product of 2-methylfuran and 1,2-dichloroethylene, may be reacted with hexachlorocyclopentadiene to form a useful insecticide, i.e., 2-(1,3,4,5,6,7,7-heptachloro-2-norbornen-2-ylmethyl)-furan.

In one of its broad aspects, this invention embodies a process for preparing a 3-chloroallylic furan which comprises heating a mixture of an alkylfuran, a polyhaloolefin and a free radical generating compound at a temperature of from about 50° C. to about 300° C. and at least as high as the decomposition temperature of the free radical generating compound, said alkylfuran being characterized in that it contains at least one hydrogen atom attached to an alpha-carbon atom of an alkyl substituent and said polyhaloolefin being characterized in that it contains at least one chlorine atom attached to each of two doubly-bonded carbon atoms.

Another embodiment relates to a process for preparing a 3-chloroallylic furan which comprises heating a mixture of an n-alkylfuran, a polyhalomonoolefin and an organic peroxide at a temperature of from about 50° C. to about 300° C. and at least as high as the decomposition temperature of the organic peroxide, said n-alkylfuran being characterized in that it contains at least one hydrogen atom attached to an alpha-carbon atom of an alkyl substituent and said polyhalomonoolefin being characterized in that it contains at least one chlorine atom attached to each of two doubly bonded carbon atoms.

Still another embodiment concerns a process for preparing a 3-chloroallylic furan which comprises heating a mixture of a sec-alkylfuran, a polyhalomonoolefin and an organic peroxide at a temperature of from about 50° C. to about 300° C. and at least as high as the decomposition temperature of the organic peroxide, said sec-alkylfuran being characterized in that it contains at least one hydrogen atom attached to an alpha-carbon atom of an alkyl substituent and said polyhalomonoolefin being characterized in that it contains at least one chlorine atom attached to each of two doubly-bonded carbon atoms.

One of the specific embodiments of this invention is in a process for preparing 2-(3-chloroallyl)-furan which comprises heating a mixture of 2-methylfuran, 1,2-dichloroethylene and di-t-butyl peroxide at a temperature of from about 130° C. to about 280° C. and recovering the desired 2-(3-chloroallyl)-furan.

Other objects and embodiments of this invention will become apparent in the following detailed specification.

Pursuant to the process of this invention, an alkylfuran is heated together with a polyhaloolefin and a free radical generating compound. The alkylfurans operable in accordance with the process of this invention are those containing at least one hydrogen atom attached to an alpha-carbon atom of an alkyl substituent. Said alkylfurants may contain one alkyl substituent, or two, three or four alkyl substituents to give a mixture of products according to the number of alkyl substituents containing at least one hydrogen atom on an alpha-carbon atom. Suitable alkylfurans thus include 2-methylfuran, 3-methylfuran, 2-ethylfuran, 3-ethylfuran, 2-isopropylfuran, 2-n-butyl furan, 2,5-dimethylfuran, 2,5-diethylfuran, 2-methylbenzofuran, and the like.

Polyhaloolefins which can be condensed with the above-mentioned alkylfurans comprise polyhaloolefins having at least one chlorine atom attached to each of the doubly-bonded carbon atoms. As is readily observed, this type of configuration still leaves one valence of each of the doubly-bonded carbon atoms free, and these free valences may be taken up by substituents such as hydrogen atoms, halogen atoms including fluorine, chlorine and bromine, and alkyl groups such as methyl, ethyl, propyl, etc. or a haloalkyl group such as a fluoromethyl group, chloromethyl group, bromomethyl group, dichloromethyl group, trichloromethyl group, trifluoromethyl group, etc., or an aryl group. A preferred species of these polyhaloolefins comprises polychloroethylenes, in which each of the doubly-bonded carbon atoms has at least one chlorine atom attached thereto. Examples of suitable polychloroolefins include 1,2-dichloroethylene, trichloroethylene, 1-fluoro-1,2-dichloroethylene, 1-bromo-1,2-dichloroethylene, tetrachloroethylene, 1,2-difluoro-1,2-dichloroethylene, 1,2-dibromo-1,2-dichloroethylene, 1-fluoro-2-bromo-1,2 - dichloroethylene, 1,2-dichloro-1-propene, 1,1,2-trichloro-1-propene, 1,1,2,3-tetrachloro-1-propene, 1,2,3-trichloro-1-propene, 1,2,3,3-tetrachloro-1-propene, 1,2,3,3,3-pentachloro-1-propene, 1-fluoro-1,2-dichloro-1-propene, 1,2-difluoro-1,2-dichloro-1-propene, 3-fluoro-1,2-dichloro - 1 - propene, 1,3,3-trifluoro-1,2-dichloro-1-propene, 3,3,3-trifluoro - 1,2-dichloro-1-propene, 1,2-dichloro-1,3-difluoro - 1 - propene, 1-bromo-1,2-dichloro-1 - propene, 3,3 - dibromo - 1,2 - dichloro-1-propene, 3-bromo-1,2-dichloro-1-propene, 1,3-dibromo-1,2-dichloro-1-propene, 3,3,3-tribromo-1,2 - dichloro-1-propene, 1,3,3-tribromo-1,2-dichloro-1-propene, 1,2-dichloro-1-butene, 2,3-dichloro-2-butene, 1,2-dichloro-3-methyl-1-butene, 1,1,2-trichloro-1-butene, 1,2,3-trichloro- 1-butene, 1,1,2,3-tetrachloro-1-butene, 1,1,1-trifluoro-2,3-dichloro-2-butene, 1,2,3,3-tetrachloro-1-butene, 1,1,2-trichloro-3-methyl-butene, 1,2-dichloro-1 - pentene, 2,3 - dichloro-2-pentene, 1,2-dichloro-1-hexene, 2,3 - dichloro - 2-hexene, 3,4-dichloro-3-hexene, 1,2-dichloro-1-heptene, 1,2-dichloro-1-octene, 1,2-dichloro-1-nonene, 1,2-dichloro-1-decene, etc. Polyhaloolefins are also intended to include polyhalocycloolefins such as 1,2-dichlorocyclopentene, 1,2-dichlorocyclohexene, etc. It is essential that the polyhaloolefins contain at least two chlorine atoms per molecule since monochloroolefins do not give a condensation reaction of the type herein contemplated. Similarly, polyhaloolefins other than the polyhaloolefins containing at least one chlorine atom on each of the doubly-bonded carbon atoms do not give reactions of the type herein described. For example, 1,2-dibromoethylene as well as tribromoethylene are inoperative in the process of this invention. As set forth hereinabove, polyhaloolefins such as 3,3,3-trifluoro-1,2-dichloro-1-propene that contain one or more fluorine atoms may be used in this process since the fluorine atoms in such compounds do not noticeably affect the activity of the chlorine atoms. Likewise, one or more fluorine atoms may be attached to the doubly-bonded carbon atoms provided that the above mentioned requirement for chlorine atoms attached to the doubly-bonded carbon atoms is met.

The selected polyhaloolefin and alkylfuran are reacted in contact with a free radical generating compound which acts to initiate or catalyze the condensation reaction at reaction conditions. Suitable free radical generating compounds include peroxy compounds containing the bivalent radical —O—O— which decompose to form free radicals and initiate the condensation reaction. Examples of such free radical generating compounds include the persulfates, perborates, and the percarbonates of ammonium and of the alkali metals. Organic peroxy compounds constitute a preferred class of peroxy compounds and include peracetic acid, persuccinic acid, dimethyl peroxide, diethyl peroxide, diisopropyl peroxide, di-t-butyl peroxide, acetyl peroxide, butyryl peroxide, lauroyl peroxide, benzoyl peroxide, 2,4-dichlorobenzoyl peroxide, tetralin peroxide, urea peroxide, t-butylperbenzoate, t-butyl hydroperoxide, methylcyclohexyl hydroperoxide, diisopropylbenzoyl hydroperoxide, cumene hydroperoxide, methylethylketone peroxide, cyclohexanone peroxide, etc., the dialkyl and diacyl peroxides being particularly preferred. Mixtures of peroxy compounds may be employed as catalysts, or said peroxy compounds may be utilized in admixture with various diluents. Thus, commercially available organic peroxy compounds compounded with various diluents, including benzoyl peroxide composited with calcium sulfate, benzoyl peroxide composited with camphor, etc., may be utilized. Only catalytic amounts (less than stoichiometric amounts) need be used in the process.

The present process is effected at a temperature at least as high as the initial decomposition temperature of the particular free radical generating compound employed. Free radical generating compounds such as peroxy compounds, particularly organic peroxides, decompose at a measurable rate with time in a logarithmic function dependent upon temperature. This rate of decomposition is ordinarily expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction temperature is selected at which the free radical generating compound will decompose with the generation of sufficient free radicals to initiate the condensation reaction and at which temperature the half life of said compound is such as to cause the reaction to proceed smoothly at a suitable rate. When the half life of the free radical generating compound is greater than 10 hours, radicals are not generated at a sufficient rate to cause the contemplated reaction to go forward at a satisfactory rate. Thus, the reaction temperature may be within the range of from about 50° C. to about 300° C. and at least as high as the decomposition temperature of the free radical generating compound, by which is meant a temperature such that the half life of the free radical generating compound is usually not greater than 10 hours. Since the half life for each free generating compound is different at different temperatures, the exact temperature to be utilized in a particular reaction will vary. However, persons skilled in the art are well acquainted with the half life versus temperature data for different free radical generating compounds. Thus, it is within the skill of one familiar with the art to select the particular temperature needed for any particular initiator. However, the operating temperature generally should not exceed the decomposition temperature of the free radical generating compound by substantially more than about 150° C. since free radical generating catalysts decompose rapidly under such high temperature conditions. For example, the half life of t-butyl perbenzoate is less than 10 hours at 110° C., and therefore when this peroxy compound is used, the reaction temperature is from about 110° C. to about 300° C., but generally lower than about 265° C. A reaction temperature of from about 130° C. to about 280° C. is suitable when the peroxy compound is di-t-butyl peroxide, and of from about 75° C. to about 300° C., but generally not in excess of about 225° C., with benzoyl peroxide. Higher reaction temperatures may be employed, but little advantage is gained if the temperature is in excess of the decomposition temperature of the free radical generating compound by more than about 150° C. as hereinbefore mentioned.

The reaction conditions herein utilized relate principally to temperature. Although it may be desirable to employ superatmospheric pressures of up to about 100 atmospheres or more, for example, to maintain the reactants in a liquid phase during the course of the reaction, pressure is not considered to be an important variable in relation to the herein described condensation reaction and in many cases may be simply autogenous pressure developed during the course of the reaction. In batch type operations it is often desirable to seal the reaction mixture in a closed vessel and to pressure the vessel to 10 or 30 or 50 or more atmospheres with an inert gas such as nitrogen to insure liquid phase reaction conditions.

The concentration of the free radical generating compound will vary over a rather wide range. However, a relatively low concentration, say from about 0.1 weight percent to about 10 weight percent based on the weight of the polychloroolefin, effectively catalyzes the condensation reaction. The reaction time may be from less than 1 minute to several hours, depending on the temperature of the reaction and on the half life of the catalyst. Generally spaking, the contact times of at least 10 minutes are preferred.

The condensation reaction herein contemplated between a polyhaloolefin having at least one chlorine atom attached to each of the doubly-bonded carbon atoms and an alkylfuran containing at least one carbon atom in alpha position to the double bond which contains at least one hydrogen atom attached thereto, is illustrated by the following equation showing the condensation of 1,2-dichloroethylene with 2-methylfuran.

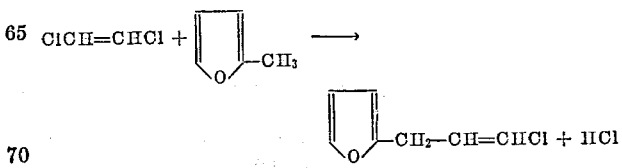

Hydrogen chloride is evolved in the condensation reactions herein disclosed. In cases where it is desirable to avoid radical changes in pH during the course of the reaction, small amounts of materials which have a buffering effect on the pH may be included in the reaction mixture. For example, an alkaline pH can be maintained by the use of buffers such as borax, disodium phosphate, sodium carbonate, ammonium carbonate, sodium acetate, etc.

The process of this invention may be effected in any suitable manner and may comprise a batch or continuous type of operation. In the case of a batch type of operation, a quantity of starting materials comprising an alkylfuran, a polychloroolefin, and a free radical generating compound is charged to a suitable reaction vessel and heated therein at a preselected reaction temperature. The reaction vessel may be a closed vessel or it may be an open vessel with an overhead reflux condenser. The vessel should in either case be provided with heating means as well as mixing means to insure adequate contact of reactants and the free radical generating compound. At the expiration of a suitable reaction period, the vessel contents are cooled to about room temperature, treated with dilute alkali, water-washed and dried. The dried reaction product is recovered from the unreacted starting materials by conventional means, for example, by fractional distillation.

The product of this invention may be prepared in a continuous type of process wherein the reactants and the free radical generating compound are charged in a continuous stream to a reactor maintained at the proper conditions of temperature and pressure. The reactor may be an unpacked vessel or coil, or it may contain an adsorbent packing material such as firebrick, alumina, dehydrated bauxite, and the like. The reaction mixture is continuously withdrawn from the reactor at a rate which will insure adequate residence time therein. The product is separated from the reactor effluent and unreacted starting materials are recycled for further use as a portion of the feed material.

The following examples are presented to further illustrate the process of this invention. Said examples are for the purpose of illustration only and are not intended as a limitation in any manner on the generally broad scope of this invention as set out in the appended claims.

EXAMPLE I 2-(3,3-dichloroallyl)-5-methylfurane was prepared by charging about 150 grams of trichloroethylene, 50 grams of 2,5-dimethylfuran and 10 grams of di-t-butyl peroxide to a glass-lined autoclave of about 850 cc. capacity and heating the same therein under 30 atmospheres initial nitrogen pressure at 130–140° C. over a 4-hour period while rotating the autoclave. The autoclave was thereafter cooled and vented to the atmosphere and the contents were water-washed, dried and distilled at about 0.1 mm. A fraction boiling at 70–73° C. (0.1 mm.) with a refractive index of $n_D^{20}$ 1.5050 was recovered and identified by nuclear magnetic resonance to be 2-(3,3-dichloroallyl)-5-methylfuran.

EXAMPLE II 106 grams of 1,2-dichloroethylene, 40 grams of 2-methylfuran and 5 grams of di-t-butyl peroxide are charged to an 850 cc. capacity glass-lined autoclave and sealed therein under 30 atmospheres initial nitrogen pressure at room temperature. The autoclave is rotated and heated at 130–140° C. over a period of about 4 hours and thereafter cooled and vented to the atmosphere. Distillation of the water-washed and dried liquid porduct at reduced pressure yields a 2-(-3-chloroallyl)-furan fraction.

EXAMPLE III 2-(2,3,3-trichloroallyl)-furan is prepared by charging about 180 grams of tetrachloroethylene, 40 grams of 2-methylfuran and 8 grams of benzoyl peroxide to a glass lined autoclave and heating the same therein under 30 atmospheres initial nitrogen pressure at 80° C. over about a 4-hour period while rotating the autoclave. The autoclave is thereafter cooled and vented to the atmosphere. The autoclave contents are water-washed, dried and distilled at reduced pressure to yield the 2-(2,3,3-trichloroallyl)-furan.

EXAMPLE IV 150 grams of trichloroethylene, 45 grams of 2-ethylfuran and 10 grams of di-t-butyl peroxide are charged to an 850 cc. glass-lined autoclave and sealed therein under 30 atmospheres of nitrogen at about room temperature. The autoclave is then rotated and heated at 130–140° C. over about a 4-hour period. Thereafter, the autoclave is cooled to room temperature and vented to the atmosphere. The autoclave contents are water-washed, dried and distilled at reduced pressure to yield the 2-(1-methyl-3,3-dichloroallyl)-furan.

EXAMPLE V

About 165 grams of 1,2-dichlorocyclohexene, 40 grams of 2-methylfuran and 10 grams of benzoyl peroxide are charged to a glass-lined autoclave and sealed therein under 30 atmospheres of nitrogen at about room temperature. The autoclave is then rotated and heated at 80° C. over a period of about 4 hours. Thereafter, the autoclave is cooled to room temperature and vented to the atmosphere. The autoclave contents are water-washed, dried and distilled at reduced pressure to yield a 2-(2-chloro-1-cyclohexenylmethyl)-furan fraction.

I claim as my invention:

1. A process for preparing a 3-chloroallylic furan which comprises heating a mixture of an alkylfuran, a polyhalomonoolefin and a peroxy compound at a temperature of from about 50° C. to about 300° C. and at least as high as the decomposition temperature of the peroxy compound, said alkylfuran being characterized in that it contains from 1 to 4 lower alkyl substituents and has at least one hydrogen atom attached to an alpha-carbon atom of an alkyl substituent and said polyhalomonoolefin being characterized in that it contains at least one chlorine atom attached to each of two doubly-bonded carbon atoms.

2. A process for preparing a 3-chloroallyllic furan which comprises heating a mixture of an alkylfuran, a polyhalomonoolefin and an organic peroxide at a temperature of from about 50° C. to about 300° C. and at least as high as the decomposition temperature of the organic peroxide, said alkylfuran being characterized in that it contains from 1 to 4 lower alkyl substituents and has at least one hydrogen atom attached to an alpha-carbon atom of an alkyl substituent and said polyhalomonoolefin being characterized in that it contains at least one chlorine atom attached to each of two doubly-bonded carbon atoms.

3. The process of claim 1 further characterized in that said alkylfuran is selected from the group consisting of n-lower alkylfuran, sec-lower alkylfuran, and di-lower alkylfuran in which each alkyl substituent is primary or secondary.

4. A process for preparing 2-(3-chloroallyl)-furan which comprises heating a mixture of 2-methylfuran, 1,2-dichloroethylene and di-t-butyl peroxide at a temperature of from about 130° C. to about 280° C. and recovering the resulting 2-(3-chloroallyl)-furan.

5. A process for the preparation of 2-(3-chloroallyl)-5-methylfuran which comprises heating a mixture of 2,5-dimethylfuran, 1,2-dichloroethylene and di-t-butyl peroxide at a temperature of from about 130° C. to about 280° C. and recovering the resulting 2-(3-chloroallyl)-5-methylfuran.

6. A process for preparing 2-(1-methyl-3,3-dichloroallyl)-furan which comprises heating a mixture of 2-ethylfuran, trichloroethylene and di-t-butyl peroxide at a temperature of from about 130° C. to about 280° C. and recovering the resulting 2-(1-methyl-3,3-dichloroallyl)-furan.

7. A process for preparing 2-(2,3,3-trichloroallyl)-furan which comprises heating a mixture of 2-methylfuran, tetrachloroethylene and benzoyl peroxide at a temperature of from about 75° C. to about 225° C. and recovering the resulting 2-(2,3,3-trichloroallyl)-furan.

8. A process for preparing 2-(2-chloro-1-cyclohexenylmethyl)-furan which comprises heating a mixture of 2-methylfuran, 1,2-dichlorocyclohexene and benzoyl peroxide at a temperature of from about 75° C. to about 225° C. and recovering the resulting 2-(2-chloro-1-cyclohexenylmethyl)-furan.

References Cited

UNITED STATES PATENTS 2,641,600  6/1953  Harban et al. _____ 260—346.1

ALEX MAZEL, Primary Examiner.

B. I. DENTZ, Assistant Examiner

U.S. Cl. X.R.

260—999